Patented Nov. 12, 1929

1,735,118

UNITED STATES PATENT OFFICE

LUDWIG KUNZ, OF NEW YORK, N. Y., ASSIGNOR TO THE LASH'S PRODUCTS COMPANY, OF SAN FRANCISCO, CALIFORNIA, A CORPORATION OF CALIFORNIA

METHOD OF PREPARING FRUIT SYRUPS

No Drawing. Application filed June 12, 1926. Serial No. 115,676.

The present invention relates to the manufacture of fruit syrups, and more particularly those in which the fruit juice and the flavoring principle contained in the rind of the fruits, with or without the pulp, are made into a syrup with appropriate amounts of sugar.

It particularly pertains to improvements in the manufacture of fruit syrups from the citrus fruits—genus *Citrus medica* and *Citrus aurantium*, typical representatives of which are lemons, limes, oranges, bergamots, grape fruit, and others—where part of the flavor may be derived from the essential oil secreted in small vesicles in the rind or exocarp of the fruits.

The aforesaid essential oils, which are the chief flavoring principles derived from the rind, under certain conditions are subject to rapid deterioration, and this led me to try to find a remedy for the trouble.

To prevent flavor deterioration due to the deleterious effect of the acid and water of the fruit juice and pulp, I prepare two separate syrups, of which the following is a typical instance:

The respective fruits are first peeled in such a manner that that part of the rind which contains the essential oil or flavoring principle is carefully and completely removed and separated from the rest of the fruits. The said rind is extracted and the flavoring principle with appropriate amounts of sugar and water is separately made into a syrup. From the peeled fruits the juice or juice and pulp are extracted and with appropriate amounts of sugar are separately prepared into another syrup.

The two separate and distinctive syrups— one containing the flavoring principle derived from the rind, and the other containing the juice or juice and pulp of the fruits— are kept and stored in separate containers until such time when their consumption is intended, when they are mixed together with or without suitable amount of water.

To make my invention more clear, I may state that the fruit acid contained in the citrus fruits which is commonly known as the citric acid of commerce, in conjunction with the fruit water contained in the juice and pulp of the fruits, may vigorously attack, modify or destroy the flavoring principle derived from the rind of the fruits, in cases where such flavoring principle is added or mixed into the fruit juice, or fruit juice and pulp, or into the syrup prepared from such fruit juice or fruit juice and pulp.

The citric acid of commerce may have the same deleterious effect as the natural acid in the fruit juice; and citric acid of commerce if employed in appreciable quantities, should be added only to the syrup prepared from the juice and pulp, and not to the syrup containing the flavoring principle of the rind.

I may further explain that the deterioration of the aforesaid flavoring principle causes the development of a foreign disagreeable odor in the syrup, which odor is commonly referred to as rancid, terebenthene, or of the nature of turpentine. This odor renders the syrup unmarketable in some cases, and impairs to a greater or lesser degree its quality and marketability in others.

The rate of deterioration of the flavoring principle derived from the rind is different in syrups from different species of citrus fruits, and is more marked in syrups made from limes and lemons than in syrups made from oranges.

Syrups prepared from citrus fruits in accordance with my invention, differ from commonly prepared syrups, pronouncedly in regard to keeping quality. To particularize on this point, I may state that a lemon syrup prepared from juice and the flavoring principle derived from the rind, or from juice and pulp and the flavoring principle derived from the rind, will turn rancid within about two weeks. On the other hand, a lemon syrup prepared separately in two component parts as above described will keep many months, to a year or over, without noticeable signs of flavor deterioration.

Syrups made from citrus fruits and prepared according to the new method, that I have invented, show a marked improvement over the commonly prepared syrups with regard to pureness and freshness of flavor, keeping quality and freedom from rancidness.

In syrups prepared according to the above described method, the deleterious effect of the fruit acid and water on the flavoring principle derived from the rind is entirely eliminated by preparing separate and distinctive syrups from distinctively different parts of the fruits, namely, one syrup from the rind or flavoring principle contained in the rind or exocarp and another syrup from the juice or juice and pulp of such fruit, from which the rind and flavoring principle of the rind has been separated and removed.

These separate syrups are kept in separate containers and only combined shortly before use.

What I claim and desire to secure by Letters Patent is:

1. In the manufacture of fruit syrups from citrus fruits, the steps of preparing a separate and distinctive syrup from the rind, preparing a separate syrup from the juice, and combining them only shortly before use, whereby the deleterious action of the acid and water of the juice is prevented from acting on the flavoring principle derived from the rind.

2. In the manufacture of fruit syrups from citrus fruits, the steps of preparing a separate and distinctive syrup from the flavoring principle of the rind, then preparing a separate and distinctive syrup from the juice and pulp, preserving them separate from each other and only adding them together shortly before use.

In testimony whereof I affix my signature.

LUDWIG KUNZ.